(12) United States Patent
Woodruff

(10) Patent No.: US 6,464,875 B1
(45) Date of Patent: Oct. 15, 2002

(54) FOOD, ANIMAL, VEGETABLE AND FOOD PREPARATION BYPRODUCT TREATMENT APPARATUS AND PROCESS

(75) Inventor: Steven R. Woodruff, Canton, GA (US)

(73) Assignee: Gold Kist, Inc., Atlanta, GA (US)

( * ) Notice: Subject to any disclaimer, the term of this patent is extended or adjusted under 35 U.S.C. 154(b) by 0 days.

(21) Appl. No.: 09/556,957

(22) Filed: Apr. 21, 2000

Related U.S. Application Data

(60) Provisional application No. 60/130,527, filed on Apr. 23, 1999.

(51) Int. Cl.[7] ............................... C02F 3/28; C05F 7/00
(52) U.S. Cl. ..................... 210/603; 210/252; 210/259; 210/360.1; 210/903; 71/10; 71/15; 71/23; 71/25
(58) Field of Search ................................ 210/603, 609, 210/612, 613, 195.1, 252, 259, 360.1, 512.1, 513, 903; 71/10, 14, 15, 23, 25

(56) References Cited

U.S. PATENT DOCUMENTS

| | | |
|---|---|---|
| 484,823 A | 10/1892 | Scruby |
| 800,187 A | 9/1905 | Venable |
| 2,172,646 A | 9/1939 | Walker |
| 2,183,657 A | 12/1939 | Page |
| 2,198,737 A | 4/1940 | Petersen ..................... 210/603 |
| 2,758,875 A | 8/1956 | Loveless |
| 2,777,815 A | 1/1957 | Forrest |
| 2,786,025 A | 3/1957 | Lamb et al. |
| 2,809,933 A | 10/1957 | Halvorson |
| 2,992,986 A | 7/1961 | Ingram |
| 3,192,155 A | 6/1965 | Bready et al. |
| 3,231,490 A | 1/1966 | Fry |
| 3,303,106 A | 2/1967 | Standiford, Jr. |
| 3,329,271 A | 7/1967 | Ward et al. |
| 3,341,450 A | 9/1967 | Ciabattari et al. |
| 3,371,033 A | 2/1968 | Simmons et al. |
| 3,383,309 A | 5/1968 | Chandler ..................... 210/603 |
| 3,398,088 A | 8/1968 | Okey ......................... 210/610 |
| 3,423,309 A | 1/1969 | Albertson ................... 210/624 |
| 3,468,795 A | 9/1969 | Jorgensen et al. |
| 3,546,111 A | 12/1970 | Busch ......................... 210/603 |
| 3,617,539 A | 11/1971 | Grutsch |
| 3,617,540 A | 11/1971 | Bishop et al. ............... 210/630 |
| 3,730,881 A | 5/1973 | Armstrong |

(List continued on next page.)

FOREIGN PATENT DOCUMENTS

| | | |
|---|---|---|
| DE | 39 01 404 A1 | 3/1989 |
| EP | 0 029 536 * | 6/1981 |
| JP | 55-15279 | 10/1976 |
| WO | 94/24056 | 10/1994 |

OTHER PUBLICATIONS

Riffat et al., "Laboratory Studies on the Anaerobic Biosorption Process", Pub.: Water Environment Research, Nov.–Dec., 1995, pp. 1104–1110.

(List continued on next page.)

Primary Examiner—David A. Simmons
Assistant Examiner—Fred Prince
(74) Attorney, Agent, or Firm—Foley & Lardner

(57) ABSTRACT

A system and method for converting animal, vegetable, and food byproduct materials into useful bio-gas and fertilizer, and/or soil amendment products has an anaerobic digester, a liquid-solids separating unit, an ammonia stripper, an ammonia absorption unit, a solids processing unit, and an equilization tank. The system and method use anaerobic digestion to break down the fats, oils, and greases, proteinaceous, and carbonaceous substances contained in the byproducts. Anaerobic digestion creates bio-gas, mainly methane and carbon dioxide, waste biosolids, which can contain phosphorous, nitrogen and other trace minerals, and a liquid effluent with significant ammonia levels. Ammonia, a useful ingredient for fertilizer formulation, is recovered from the effluent. The solids and the extracted ammonia and/or phosphorous can also be used to make fertilizer and/or soil amendment materials. The bio-gas can be used to fuel various energy recovery devices, such as boilers for steam generation, gas engine generator systems for power generation.

16 Claims, 2 Drawing Sheets

U.S. PATENT DOCUMENTS

| | | | |
|---|---|---|---|
| 3,847,803 A | 11/1974 | Fisk | |
| 3,898,058 A | 8/1975 | McGill | |
| 3,920,419 A | 11/1975 | Schroeder et al. | |
| 3,929,586 A | 12/1975 | Slikkers, Jr. | |
| 3,930,998 A * | 1/1976 | Knopp et al. | |
| 3,953,326 A | 4/1976 | Reimann | |
| 3,960,717 A | 6/1976 | Wyatt | |
| 3,977,972 A | 8/1976 | Bloch et al. | |
| 3,981,800 A | 9/1976 | Ort | |
| 4,017,421 A | 4/1977 | Othmer | |
| 4,040,953 A * | 8/1977 | Ort | |
| 4,040,963 A | 8/1977 | Garrott, Jr. | 210/219 |
| 4,053,394 A | 10/1977 | Fisk | |
| 4,060,591 A * | 11/1977 | Garber et al. | |
| 4,076,515 A * | 2/1978 | Rickard | |
| 4,093,544 A | 6/1978 | Ross | |
| 4,129,502 A | 12/1978 | Garrett et al. | |
| 4,160,725 A | 7/1979 | Josis et al. | |
| 4,289,625 A | 9/1981 | Tarman et al. | 210/603 |
| 4,298,621 A | 11/1981 | Samis et al. | |
| 4,318,993 A | 3/1982 | Ghosh et al. | |
| 4,321,410 A | 3/1982 | Ono et al. | |
| 4,328,104 A | 5/1982 | Hanke et al. | 210/603 |
| 4,354,936 A | 10/1982 | Ishida et al. | 210/602 |
| 4,367,146 A | 1/1983 | Pollock et al. | |
| 4,369,194 A | 1/1983 | Arsovic | 426/59 |
| 4,372,856 A | 2/1983 | Morrison | 210/603 |
| 4,375,412 A | 3/1983 | Schimel | |
| 4,401,565 A | 8/1983 | Schimel | |
| 4,415,453 A * | 11/1983 | Witt et al. | |
| 4,421,534 A | 12/1983 | Walker | |
| 4,424,115 A | 1/1984 | Farrell | |
| 4,430,225 A | 2/1984 | Takamatsu et al. | |
| 4,447,333 A | 5/1984 | Wagener et al. | |
| 4,460,470 A | 7/1984 | Reimann | 210/605 |
| 4,477,420 A * | 10/1984 | Bauer et al. | |
| 4,491,522 A | 1/1985 | Ishida et al. | |
| 4,503,154 A | 3/1985 | Paton | 435/167 |
| 4,508,545 A | 4/1985 | DeLoach | |
| 4,522,727 A | 6/1985 | Weber | |
| 4,541,986 A | 9/1985 | Schwab et al. | |
| 4,551,250 A | 11/1985 | Morper et al. | |
| 4,559,142 A | 12/1985 | Morper | |
| 4,597,872 A | 7/1986 | Andersson et al. | |
| 4,613,697 A | 9/1986 | Pagani | |
| 4,623,370 A | 11/1986 | Allen et al. | |
| 4,643,888 A | 2/1987 | Palm | |
| 4,652,374 A | 3/1987 | Cohen | |
| 4,657,680 A | 4/1987 | Zibrida | |
| 4,659,471 A | 4/1987 | Molin et al. | |
| 4,662,929 A | 5/1987 | Lammi | |
| 4,689,156 A | 8/1987 | Zibrida | |
| 4,696,746 A | 9/1987 | Ghosh et al. | 210/603 |
| 4,710,300 A * | 12/1987 | Kristoufek | |
| 4,722,741 A | 2/1988 | Hayes et al. | |
| 4,735,723 A | 4/1988 | Mulder | |
| 4,765,900 A | 8/1988 | Schwoyer et al. | |
| 4,772,307 A | 9/1988 | Kiss et al. | |
| 4,778,490 A | 10/1988 | Pollert | |
| 4,780,415 A | 10/1988 | Ducellier et al. | 435/166 |
| 4,787,978 A | 11/1988 | Nicol | |
| 4,826,600 A | 5/1989 | Ely et al. | 210/603 |
| 4,832,848 A | 5/1989 | Velebil et al. | |
| 4,839,052 A | 6/1989 | Maree | |
| 4,846,975 A | 7/1989 | Kelyman | |
| 4,857,198 A | 8/1989 | Meidl | 210/603 |
| 4,894,162 A | 1/1990 | Cournoyer et al. | |
| 4,919,813 A | 4/1990 | Weaver | 210/603 |
| 4,933,087 A | 6/1990 | Markham, Jr. et al. | 210/626 |
| 4,956,094 A | 9/1990 | Levin et al. | 210/625 |
| 5,015,384 A | 5/1991 | Burke | |
| 5,053,234 A | 10/1991 | Anderson et al. | 426/59 |
| 5,057,221 A | 10/1991 | Bryant et al. | 210/610 |
| 5,076,928 A | 12/1991 | Ballnus | 210/605 |
| 5,125,951 A | 6/1992 | Lahoda et al. | |
| 5,185,079 A | 2/1993 | Dague | |
| 5,200,065 A | 4/1993 | Sinclair et al. | |
| 5,217,624 A | 6/1993 | Yamane et al. | |
| 5,225,085 A | 7/1993 | Napier et al. | |
| 5,232,596 A | 8/1993 | Castaldi | 210/603 |
| 5,234,606 A | 8/1993 | Kazama et al. | |
| 5,234,607 A | 8/1993 | Brandenburg et al. | |
| 5,236,557 A | 8/1993 | Müller et al. | |
| 5,246,584 A | 9/1993 | Donaldson et al. | 210/603 |
| 5,264,367 A | 11/1993 | Aalrust et al. | 435/271 |
| 5,277,814 A | 1/1994 | Winter et al. | 210/604 |
| 5,337,898 A | 8/1994 | Hamelers et al. | |
| 5,360,546 A | 11/1994 | Tomita et al. | |
| 5,360,555 A | 11/1994 | Batten | |
| 5,364,529 A | 11/1994 | Morin et al. | |
| 5,431,819 A | 7/1995 | Hack et al. | |
| 5,433,846 A | 7/1995 | Roshanravan | |
| 5,500,123 A | 3/1996 | Srivastava | 210/603 |
| 5,525,228 A | 6/1996 | Dague et al. | |
| 5,529,692 A | 6/1996 | Kubler | |
| 5,531,896 A * | 7/1996 | Tambo et al. | |
| 5,532,163 A | 7/1996 | Yagi et al. | 435/271 |
| 5,543,050 A | 8/1996 | Roshanravan | 210/605 |
| 5,599,450 A | 2/1997 | Li et al. | |
| 5,627,069 A | 5/1997 | Powlen | 435/267 |
| 5,630,942 A | 5/1997 | Steiner | 210/603 |
| 5,635,077 A | 6/1997 | Stultz et al. | |
| 5,637,221 A | 6/1997 | Coyne | 210/608 |
| 5,651,890 A | 7/1997 | Trost | 210/603 |
| 5,660,721 A | 8/1997 | Kyriss | 210/86 |
| 5,670,046 A | 9/1997 | Kimmel | 210/602 |
| 5,670,047 A | 9/1997 | Burke | 210/603 |
| 5,681,470 A | 10/1997 | Safi | 210/603 |
| 5,702,572 A | 12/1997 | Fujimura et al. | |
| 5,707,417 A | 1/1998 | Yokoyama et al. | |
| 5,720,882 A * | 2/1998 | Stendahl et al. | |
| 5,741,346 A * | 4/1998 | Glover | |
| 5,782,950 A | 7/1998 | Kanitz et al. | |
| 6,037,169 A | 3/2000 | Sako et al. | |
| 6,096,214 A * | 8/2000 | Ripley | |
| 6,113,786 A | 9/2000 | Burke | |

OTHER PUBLICATIONS

Dennis A. Burke, "Pilot Plant Operation of the AGF (Anoxic Gas Floration) stabilization process at Potato Processing Facilities", Cyclus Envirosystems, 6007 Hill Road NE, Olympia WA 98516–9551.

Dennis A. Burke, "Anaerobic Digestion of Sewage Sludge Using the Anoxic Gas Flotation (AGF) Process", Cyclus Envirosystems, 6007 Hill Road NE, Olympia WA 98516–9551.

S. Grant et al., "Pilot–Scale Anaerobic Digestion of Dissolved Air Floration skimmings from Poultry Processing Wastewater", presented Sep. 5, 2001 at the "9th World Congress Anaerobic Digestion 2001" conference in Belgium.

* cited by examiner

FOOD, ANIMAL, VEGETABLE AND FOOD PREPARATION BYPRODUCT TREATMENT APPARATUS AND PROCESS

This application claims priority to provisional application Ser. No. 60/130,527 filed on Apr. 23, 1999.

BACKGROUND

Food, animal, and vegetable product and by-product processing plants, such as fish processing, red meat processing, pork processing, poultry processing, potato processing, other vegetable processing, gelatin production, rendering plants, dairy processing, other processing plants, such as cooking and breading operations, butter, ice cream, yogurt and margarine production operations, sauce and dressing production operations, etc., produce large amounts of wastewater containing high levels of organic compounds. These organic compounds include proteins, carbohydrates, starches, fats, oils and greases, phosphate and nitrogen containing compounds, and other food related solids and residues.

Dissolved air flotation (DAF), clarification, sedimentation, filtration, and other solids and fats, oils, and grease removal pretreatment/treatment processes are commonly employed to remove these constituents from the wastewater generated by these processing operations. See for instance, U.S. Pat. No. 4,933,087 issued to Markham, Jr. et al., the disclosure of which is incorporated herein by reference. Additionally, food preparation operations (i.e., restaurants, etc.) also generate similar types of food by product materials, and these materials are collected in grease traps and spent cooking oil collection systems. See for instance, U.S. Pat. No. 5,543,050 issued to Roshanravan, the disclosure of which is incorporated herein by reference. The food byproduct materials collected at these food preparation operations also contain various organic and inorganic materials, including proteins, carbohydrates, starches, fats, oils and greases, phosphate and nitrogen containing compounds, etc.

Float, filtered and/or settled material from DAF, clarification, filtration and sedimentation wastewater treatment and pretreatment operations produce a primary float, settled or filtered sludge material. Materials from DAF treatment operations are commonly referred to as DAF skimmings. These and other wastewater treatment/pretreatment operations are disclosed in *Wastewater Engineering—Treatment, Disposal and Reuse*, Third Edition, Metcalf & Eddy, Inc., McGraw-Hill, Inc., 1991; *Anaerobic Biotechnology for Industrial Wastewaters*, R. E. Speece, Vanderbilt University, Archae Press, 1996; and publications from the seminar, Anaerobic Treatment of High Strength Agricultural and Industrial Wastes, University of Wisconsin, Milwaukee, Center for Continuing Engineering Education. The disclosures of these references are incorporated herein by reference.

Treating, recycling, and disposing this food, animal and vegetable byproducts have created a significant challenge for the industries that produce them. These byproducts are typically processed in rendering/protein recovery processes to produce animal feed products and reclaimed oils. Some of these byproducts also end up as waste in landfills, or are land applied as soil amendments.

Although rendering processes can effectively handle these byproducts, these materials can pollute air and water, and corrode rendering equipment. Increased odors and other air pollutants are emitted from rendering plants when processing products containing these byproduct materials. Chemicals used with the wastewater pretreatment/treatment operations generating these byproduct materials can elevate corrosion of the rendering equipment. The products to be treated and/or recovered from these byproducts materials are typically dissolved or suspended in large amounts of water. This requires significant, and in many cases excessive, energy input to rendering devices/processes. The quality of the finished products produced in rendering these byproducts can also be poor, and their content can vary significantly. These variables can significantly increase rendering costs and degrade the overall quality of the animal feeds and oils produced.

Moreover, many of the chemicals used in DAF treatment and other wastewater treatment operations, such as flocculants, coagulants, acids, alkalies, metal salts, etc., are infused into the byproducts/wastes, which further magnify the adverse impacts these byproducts have in rendering operations and animal feed production. Feed quality can be significantly compromised due to the presence of these chemicals in the byproducts, which degrade byproducts and feed ingredients (i.e., encouraging the formation of free fatty acids and/or high peroxide values) or add other non-nutritious and/or toxic materials to the animal feed products produced. Further, other plant chemicals, such as sanitation chemicals, fuels, lubricating and hydraulic oils, degreasing chemicals, heavy metals, dirt, debris, and fecal material, also tend to partition into solids during wastewater treatment/pretreatment operations.

Animal feeds containing these undesirable materials have a limited market and must be sold at substantially discounted prices. In addition, higher quality/value animal feed materials must be commonly blended with the byproduct materials to produce an acceptable quality animal feed material. If the rendering plant is producing pet food grade feed, additional processing equipment is required to handle DAF skimmings and other wastewater treatment solids since pet food manufacturers will not typically purchase any feed ingredients containing these materials. There have also been several instances where these byproduct materials have significantly contaminated animal feed products making them unsafe for use. There have been still other instances where the meat products from the animals fed on feeds containing these byproducts have become significantly contaminated.

Given all these problems, whether potential and realized, there is a strong need for an effective, environmentally friendly, non-rendering type treatment for DAF skimmings and other food solids byproducts. It would be highly desirable to take these byproducts from the "food-chain." The present invention addresses these needs.

SUMMARY

The present invention relates to a system and method that can be used to convert animal, vegetable, and food byproduct materials into useful bio-gas and fertilizer, and/or soil amendment products. The present system and method can be used on site at food, meat, poultry, and rendering plants. The present system and method use anaerobic digestion to break down the fats, oils, and greases, proteinaceous, and carbonaceous substances contained in the byproducts.

Anaerobic digestion creates bio-gas, mainly methane and carbon dioxide, waste biosolids, which can contain phosphorous, nitrogen and other trace minerals, and a liquid effluent with significant ammonia levels. Ammonia, a useful ingredient for fertilizer formulation, can be recovered from the effluent. The solids and the extracted ammonia and/or phosphorous can also be used to make fertilizer and/or soil amendment materials. The bio-gas can be used to fuel various energy recovery devices, such as boilers for steam generation, gas engine generator systems for power generation, etc.

Thus, the system and method according to the present invention can biologically convert food byproducts into useful products, such as bio-gas, fertilizer, and/or soil amendment products.

A system for converting animal, vegetable, and food byproducts into useful bio-gas and fertilizer, according to one aspect of the present invention, comprises, an anaerobic digester, a liquid-solids separating unit, an ammonia stripper, and an ammonia absorption unit. The system can further include a solids processing unit and an equilization tank.

The anaerobic digester digests or breaks down the byproducts and produces bio-gas containing methane and carbon dioxide. The liquid-solids separating unit, which can comprise a centrifuge, receives the digested byproducts from the digester and separates solids from liquid effluent. The ammonia stripper receives the liquid effluent from the liquid-solids separating unit and removes an ammonia component from the liquid effluent as an ammonia vapor. The ammonia absorption unit receives the ammonia vapor from the ammonia stripper and absorbs the ammonia component into an ammonium containing fertilizer solution. The equilization tank conditions the byproducts before the byproducts are introduced into the anaerobic digester to enhance digestion. The solids processing unit dewaters or dries the solids received from the liquid-solids separating unit.

The ammonia stripper comprises at least one set of a surge tank and a column feeding into the surge tank, and an air blower for blowing air into the column. The ammonia component in the liquid effluent is transferred into the ammonia vapor by flowing air through the column while the liquid effluent is circulated from the surge tank through the column. The liquid effluent is circulated through the column in a first direction and the air is directed into the column in a second direction, which is opposite to the first direction.

The ammonia absorbing unit similarly comprises at least one set of a surge tank and a column feeding into the surge tank. The ammonia component in the ammonia vapor is absorbed into the water by flowing the ammonia vapor through the column while the water is circulated from the surge tank through the column. The water is circulated through the column in a first direction and the ammonia vapor is directed into the column in a second direction, which is opposite to the first direction.

According to another aspect of the present invention, the system for converting animal, vegetable, and food byproducts into useful bio-gas and fertilizer, comprises means for anaerobically digesting or breaking down the byproducts and producing bio-gas containing methane and carbon dioxide, means for separating the digested byproducts from the digester into solids and liquid effluent, means for transferring an ammonia component from the liquid effluent into an ammonia vapor; and means for transferring the ammonia component from the ammonia vapor into water to form an ammonium solution.

Another aspect of the present invention includes a method of converting animal, vegetable, and food byproducts into useful bio-gas and fertilizer, comprising: anaerobically digesting or breaking down the byproducts in an anaerobic digester to produce bio-gas containing methane; collecting and storing the bio-gas from the digester; separating the digested byproducts into liquid effluent and solids; transferring an ammonia component from the liquid effluent into an ammonia vapor; transferring the ammonia component from the ammonia vapor into water to form an ammonium solution.

The method further comprises conditioning the byproducts with a conditioning agent to enhance anaerobic digestion before introducing the byproducts into the anaerobic digester; and dewatering the solids after separating the liquid effluent to form a slow release fertilizer compound. The conditioning agent can be one of a magnesium hydroxide and a magnesium oxide, and the slow release fertilizer compound formed is struvite.

The ammonia component in the liquid effluent is transferred into the ammonia vapor by flowing air or steam through the liquid effluent. The liquid effluent is circulated through at least one column filled with packing material in one direction and the air or steam is directed into the column in the opposite direction.

The ammonia component in the ammonia vapor is transferred into water by flowing the ammonia vapor across the water. The water is circulated through at least one column filled with packing material in one direction and the ammonia vapor is directed into the column in the opposite direction.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

DETAILED DESCRIPTION

Figure 1:
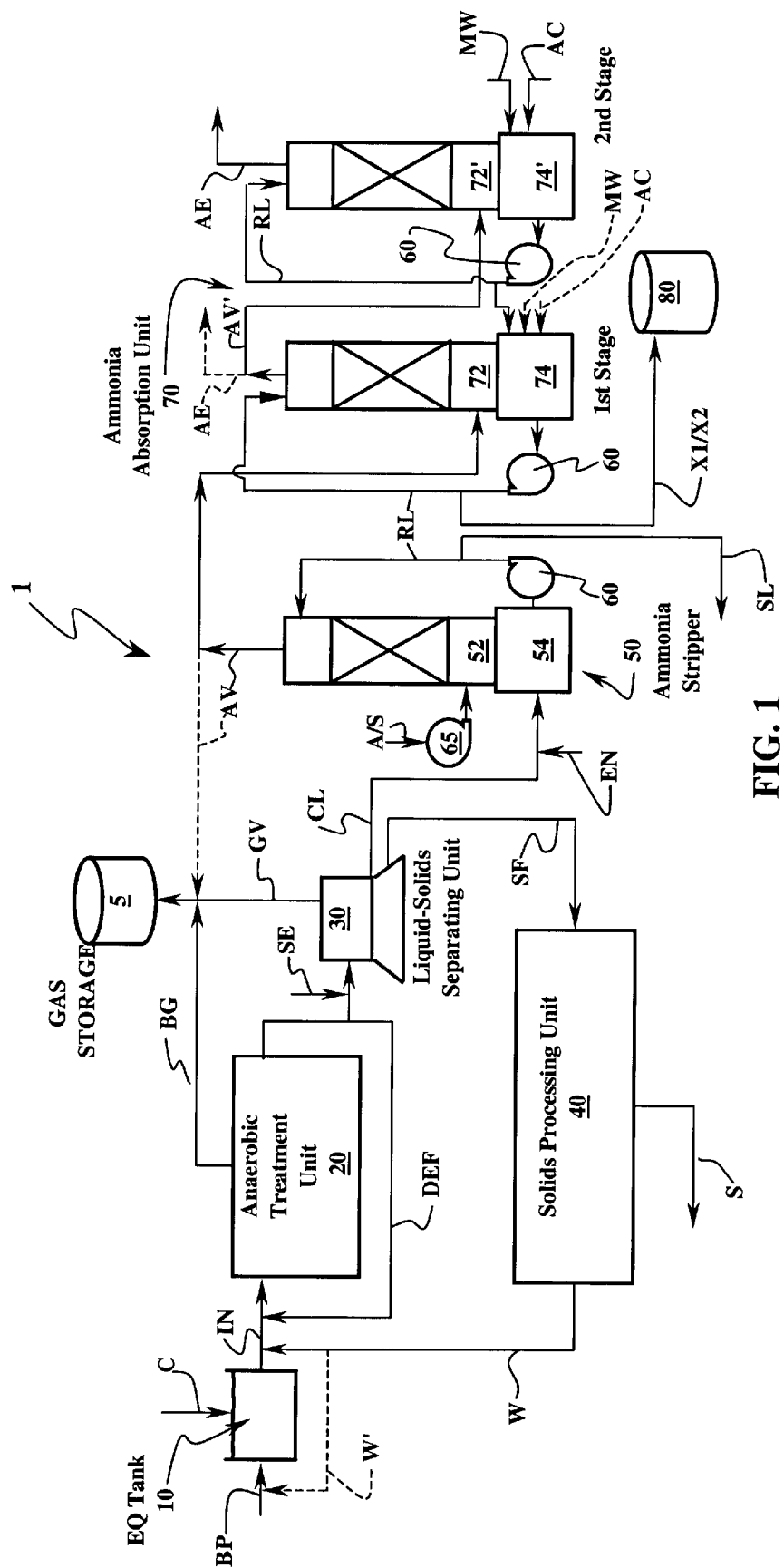
FIG. 1 schematically illustrates the present food, animal, and vegetable byproduct treatment system.

FIG. 1 schematically refers to the apparatus or system 1 that can be used to treat food, animal, vegetable byproducts, which are degradable anaerobically. The present food, animal and vegetable byproduct treatment apparatus or system 1 comprises primarily four stages, namely 1) an anaerobic digestion stage, 2) a liquid-solids separation stage, 3) an ammonia removal and recovery stage, and 4) a solids processing stage. FIG. 1 also shows an optional conditioning stage.

The system 1 exemplified in FIG. 1 comprises an equilization tank 10, an anaerobic treatment unit 20, a liquid-solids separating unit 30, a solids processing unit 40, and an ammonia stripper 50, and an ammonia absorption unit 70.

Anaerobic Treatment (Digestion) Stage

Food, animal, vegetable byproducts BP can be optionally introduced into the equalization tank 10 to condition or pre-treat the byproducts BP to enhance anaerobic digestion. Although a conditioner for enhancing anaerobic digestion is not essential, one or more conditioning agents C, such as recirculated digested effluent DEF exiting the anaerobic treatment unit 20, enzymes, acids, alkalis (such as magnesium hydroxide), alkaline earths (such as magnesium oxide), nutrients, anaerobic seed solids, and surfactants, etc., can be added to the byproducts BP to enhance anaerobic decomposition. In addition, or in lieu thereof, the byproducts BP can be subject to saponification or heating, or both, before anaerobically digesting them. These byproducts BP may also be delivered in a dewatered solids form. Water W' and/or wastewater from the processing plant can be added to the dewatered solids to reform the desired liquid slurry for further processing in the present system 1. Byproducts from various sources also can be blended to provide a more consistent feed to the anaerobic treatment unit 20.

Figure 2:
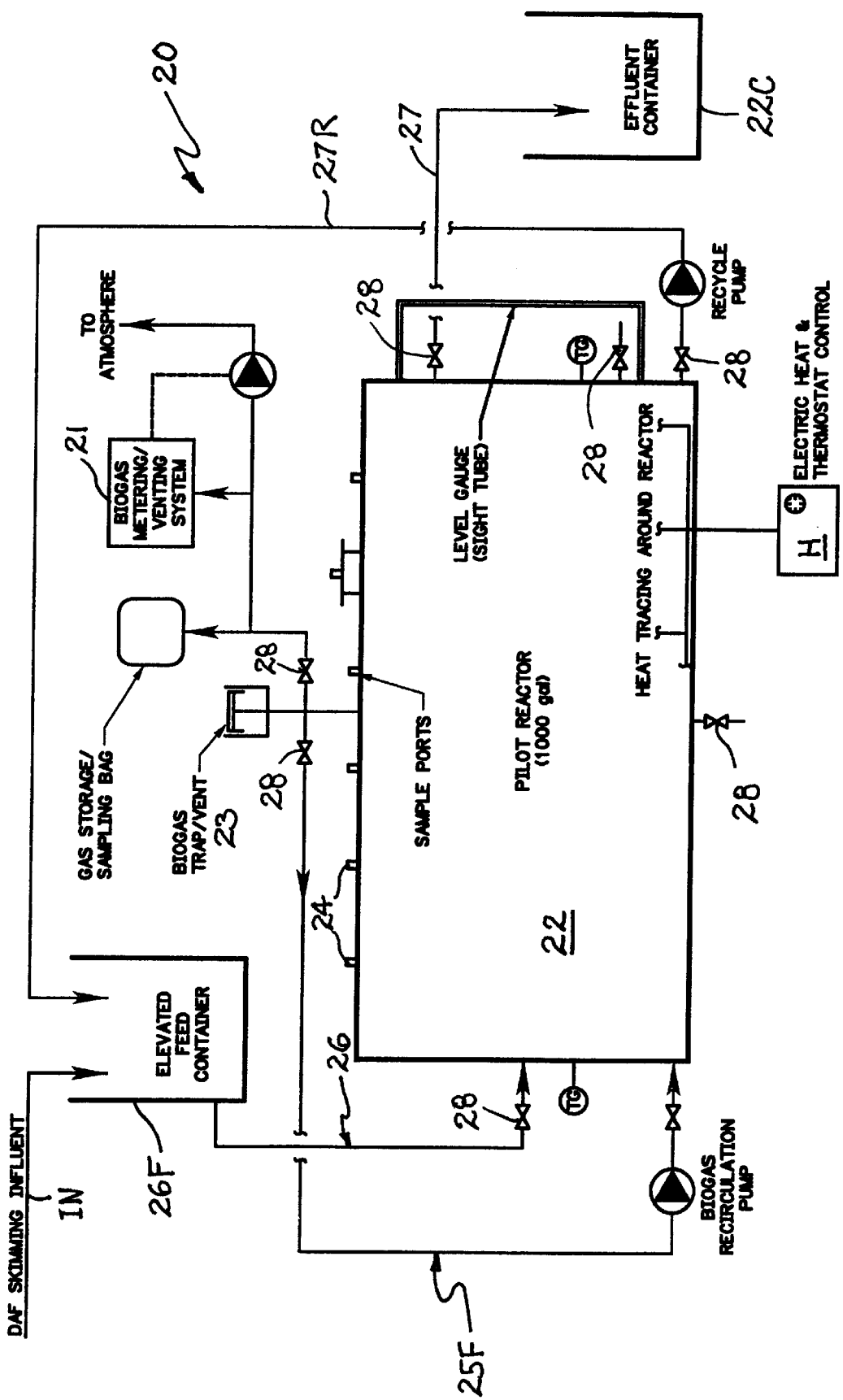
FIG. 2 schematically illustrates a detailed embodiment of the anaerobic digester.

According to the invention, the conditioning step is not essential, as mentioned before, but may be desirable under certain conditions. The conditioned (or non-conditioned) byproducts (influent) IN are fed to the anaerobic treatment unit (digester) 20, which can comprise any conventional reactor vessel or tank suitable for holding the byproducts IN. Mixing the byproducts in the tank is highly desirable to ensure effective digestion. Mixing may be accomplished with conventional mechanical mixers or by circulating (bubbling) a portion of the captured bio-gas BG back into the tank, as shown in FIG. 2.

An anaerobic treatment process in itself is known. See for instance, U.S. Pat. Nos. 2,198,737 issued to Petersen; U.S. Pat. No. 3,383,309 issued to Chandle; U.S. Pat. No. 4,354,936 issued to Ishida; U.S. Pat. No. 4,372,856 issued to Morrison; and U.S. Pat. No. 5,670,047 issued to Burke, the disclosures of which are incorporated herein by reference. During the anaerobic treatment stage, various bacteria degrade organic matters, including fats, oils and greases, proteins, carbohydrates, starches, carbonaceous materials, etc., and generate bio-gas BG, which comprises methane (about 70–80+%) and carbon dioxide (about 20–30+%), and other trace gases, such as ammonia, hydrogen sulfide, carbon monoxide, etc., (typically less than 1%).

Organic nitrogen compounds (proteins, etc.) are converted into ammonia and ammonium hydroxide. The bio-gas BG produced during the anaerobic digestion stage can be collected and used for energy recovery (power generation, steam production, etc.), or stored for later use in a gas storage tank 5. This bio-gas can be used, for instance, to fuel boilers for steam generation at a rendering facility or food, animal, vegetable, etc. processing plant. The anaerobic treatment can be operated in both the mesophylic (about 20–30° C.) and thermophilic (about 49–60° C.) temperature ranges.

A portion of the digested byproducts (effluent) DEF from the anaerobic treatment unit 20 can be recycled back to the anaerobic treatment unit 20 or the conditioning tank 10, or otherwise mixed with the influent IN, to enhance anaerobic digestion. A more stable and efficient digestion is realized by infusing the bugs (i.e., bacteria) and nutrients from the solids to the influent IN, and assimilate the microorganisms to the byproducts.

Liquid-Solids Separation Stage

The digested effluent DEF from the anaerobic treatment unit 20 is fed to the liquid-solids separating unit 30, which preferable comprises a centrifuge, to separate the solids from the liquid. Any conventional liquid-solids separating devices, such as flotation thickener, clarifier, filtration device, etc., can be used to separate solids from the effluent from the anaerobic treatment stage. Various other conventional devices can also be incorporated with the centrifuge, including gravity separators (clarifiers), dissolved air flotation units, filtration devices, such as belt press, plate and frame filter press, rotary drum filter, etc. To enhance separation, conditioning agents or separating enhancers SE, such as metal salts, lime, polymer, water, etc., can be added to the incoming digested effluent DEF. The solids fraction SF from the liquid-solids separating unit 30 is fed to the solids processing unit 40, and the liquid fraction, the clarified liquid CL, is fed to the ammonia stripper 50. Any residual gas vapor GV released or generated in the liquid-solids separation unit 30 can be collected, if desired, and combined with the bio-gas BG produced from the anaerobic treatment unit 20, and stored in the gas tank 5.

Attentively, the liquid-solids separating unit 30 also can be installed after the ammonia stripper 50. This configuration would recover additional ammonia, but could potentially increase the fouling of the ammonia stripper. The exemplified system thus can incorporate the liquid-solids separating unit 30 either after the anaerobic treatment unit 20 or the ammonia stripper 50. Under either configuration, the solids processing unit 40 would follow the liquid-solids separating unit 30.

Ammonia Removal and Recovery Stage

The clarified liquid effluent CL from the centrifuge 30 is mixed with an enhancer EN, such as alkali (to increase the pH level to enhance ammonia recovery) and heated (to enhance ammonia removal from the water) such as by using a conventional heater or boiler. The liquid effluent (mixed with the enhancer EN and heated) CL is introduced into the ammonia stripper 50, which can comprise one or more stacks or columns (only one shown) 52, packed with a packing material, feeding into a recirculation surge tank 54. Each column 52 can have an inlet for introducing air or steam, such as using an air blower 65 to force or air or steam, into the column, and an outlet for exhausting ammonia vapor. Each surge tank 54 can have an inlet for receiving the clarified liquid effluent CL from the centrifuge 30 and an outlet for removing the stripped liquid SL through a recirculation line RL using a pump 60. A portion of the stripped liquid SL removed from the surge tank 54 can be circulated into the column 52 using the recirculation line RL. Air or steam A/S introduced into the lower end of the column 52 mixes with the clarified liquid effluent CL descending through the column 52 and strips the ammonia from the clarified liquid effluent CL. The ammonia vapor AV (air/steam containing the recovered ammonia) can be discharged, for instance, to a fertilizer ingredient production unit, e.g., the ammonia absorption unit 70.

The ammonia vapor AV can be combined with the bio-gas BG, GV generated during any part of the process, such as the digestion stage and centrifuging stage, to recover energy. Gases from the different stages also can be kept segregated and/or treated separately using any conventional means as needed. The stripped liquid effluent SL from the air/steam stripper 50 can now be fed to a conventional wastewater treatment system for further treatment before it is discharged into the environment.

The ammonia vapor AV can be fed to an ammonium solution forming/fertilizer ingredient production unit 70 for formulating an ammonium containing fertilizer solution, such as ammonium sulfate, aqua ammonia, ammonium phosphate, etc. If an ammonium phosphate fertilizer solution X1 is desired, for example, the ammonia vapor AV exhausted from the ammonia stripper 50 can be fed to the ammonia absorption unit 70, which can comprise a scrubber column 72, or a series (or stages) of columns 72, 72' packed with a packing material. The first and second stage columns 72, 72' each feed into the respective recirculation surge tank 74, 74'. Each column 72, 72' can have an inlet for introducing ammonia vapor AV into the lower end thereof, an inlet for introducing recirculating ammonia absorbed liquid into the upper end thereof from its respective surge tank 74, 74' through a recirculating line RL, and an outlet for exhausting the stripped ammonia vapor AV' into the atmosphere (AE) or to inlet for introducing ammonia vapor AV of the following column 72'. The second stage tank 74' can have an inlet for receiving makeup water MW, an inlet for an enhancer, such as an acid AC, and an outlet for recirculating a portion of the ammonia absorbed liquid AAL through the recirculation line RL using a pump 60, and the remainder to the first stage surge tank 74. The first stage surge tank 74 has an inlet for receiving the ammonia absorbed liquid and an outlet for feeding the ammonia liquid to a storage 80. A portion of the ammonia absorbed liquid is recirculated into the column 72 through the recirculating line RL. If only a one-stage column 72 is used, the surge tank 72 would have the makeup water MW inlet and the acid AC inlet.

A phosphoric acid AC, for example, can be introduced into the second stage column 72 for contacting and condensing the ammonia vapor AV, AV' into liquid form, i.e., ammonium phosphate solution X1, which is collected in a vessel or the like 80 for storage. The air exhaust AE (from either the first stage column 72 if a single stage column is used or the second stage column 72') can be safely vented into the atmosphere. Makeup water MW and phosphoric acid AC are introduced into one of the columns 72, 72' to replenish the water and acid taken up by the fertilizer solution and water evaporated and exhausted into the atmosphere. A portion of the ammonium phosphate solution X1 is recycled into each of the columns through the recycle line RL using the pump 60, until a desired grade of solution is achieved. The ammonia absorption unit 70, for example, can be formulated to produce 8-24-0 (8% N, 24% $P_2O_5$, and 0% $K_2O$) grade ammonium phosphate solution X1.

Alternatively, if aqua ammonia fertilizer solution X2 is desired, for example, the ammonia absorption unit 70 can use water to strip the ammonia from the ammonia vapor AV. In this process, the ammonia reacts (dissociates) with the water to form an aqua ammonia fertilizer solution X2 (i.e., solution containing ammonium in equilibrium with ammonia). The quantity of ammonium and ammonia in the solution is dependent on the pH and temperature of the aqua ammonia solution. To lower the pH and enhance ammonia recovery, acid AC can be also added into one of the columns 72, 72'. The aqua ammonia solution X2 can be collected in the storage tank or the like 80. The air exhaust AE from the scrubber column 72, 72' is safely discharged to the atmosphere. Makeup water MW and any acid AC are added to one of the columns 72, 72' to replenish the water and acid used in the fertilizer solution and exhausted out into the atmosphere. A portion of the aqua ammonia solution X2 is recycled through each of the columns 72, 72' using the recycle line RL and the pump 60, until a desired grade thereof is achieved.

Thus, the byproduct treatment process according to the invention beneficially produces a base grade liquid fertilizer solution or used as an ingredient for producing other end-use fertilizers.

Alternatively, an ion exchange and ammonium recovery process (i.e., Ammonia Recovery Process—ARP available from ThermoEnergy Environmental Corp.), and such as disclosed in ENVIRONMENTAL TECHNOLOGY VERIFICATION REPORT FOR AMMONIA RECOVERY PROCESS, Environmental Technology Evaluation Center, 2000, the disclosure of which is incorporated herein by reference, can be used to remove and recover the ammonia instead of the air/steam stripper 50 and scrubber column unit 70. In this process, an ammonia ion specific resin is used to remove ammonia from a water stream (i.e., through adsorption) as it is passed through the ion exchange column. The ion exchange column is then back washed with a sulfuric acid solution to recover the ammonia from the resin. This solution is then further processed to produce either an ammonium sulfate fertilizer solution or a solids ammonium sulfate product (purified ammonium sulfate crystals). Either of these products can be used as a direct fertilizer product or as an ingredient in fertilizer materials.

Solids Processing Stage

The solids processing unit 40 can comprise a plate and frame filter press or other conventional device, which removes liquid from the waste biosolids. The solids processing unit 40 can further include one or more of solids dewatering, drying, pelletizing, granulation, acidulation devices, depending on the type of fertilizer or soil amendment product/ingredient produced. Drying and/or granulating the solids can covert waste biosolids into a usable fertilizer product or fertilizer ingredient and/or soil amendment product. The water W removed from the solids fraction SF can be returned to the anaerobic treatment unit 20 or the EQ tank 10, or both, for treatment.

The solids S produced in this stage can contain significant levels of nitrogen, phosphorus, and other trace metals, and elements that make an excellent crop fertilizer and/or soil amendment. These solids S also can go through an acidulation process to make the nutrients contained in these solids (phosphorus, trace metals, etc.) even more available for uptake by crops. Many of the nutrients in the solids produced in the solids processing unit 40 will be in the form of "slow release" agents (organic nitrogen forms, magnesium ammonium phosphate (struvite), etc.), which are suitable as a crop "top dressing" fertilizer. In addition, fertilizer components that are in a slow release form are more environmentally friendly from a water quality perspective.

As previously explained, conditioning compounds C can be added to the EQ tank 10. Adding magnesium hydroxide (or magnesium oxide) to the influent byproducts BP can form magnesium ammonium phosphate (struvite), which is a highly beneficial slow release fertilizer compound containing magnesium, nitrogen, and phosphate. This compound partitions or concentrates in the waste biosolids. All of the components in "struvite" are important for healthy plant growth.

Byproduct Characteristics

Tables 1 and 2 below show various examples of food byproduct characteristics from poultry processing facilities. Table 1 represents the minimum, the maximum, and the average values of the parameters listed in Table 2, which represents the samples obtained at various plants at different times.

TABLE 1

| Parameter | Units | SAMPLES (A, B, C) | | |
|---|---|---|---|---|
| | | Minimum | Maximum | Average |
| BOD | (mg/L) | | | |
| COD | (mg/L) | 87000 | 297000 | 185733.3 |
| TKN | (mg/L) | 2756.6 | 7056.0 | 4534.8 |
| O&G | (%) | 0.80 | 4.32 | 2.5 |

TABLE 1-continued

| | | SAMPLES (A, B, C) | | |
|---|---|---|---|---|
| Parameter | Units | Minimum | Maximum | Average |
| Fat | (%) | 0.66 | 5.86 | 2.5 |
| Ammonia | (mg/L) | 14.60 | 812.0 | 77.6 |
| Total Solids | (%) | 6.20 | 13.3 | 9.0 |
| Moisture | (%) | 86.70 | 93.8 | 91.0 |
| Nitrate-Nitrite | (mg/L) | 0.02 | 1.74 | 0.4 |
| Protein | (%) | 1.88 | 3.64 | 2.7 |
| Mercury | (mg/L) | 0.002 | 0.1 | 0.0 |
| Arsenic | (mg/L) | 0.03 | 0.5 | 0.2 |
| Cadinium | (mg/L) | 0.01 | 2.0 | 0.7 |
| Chromium | (mg/L) | 0.01 | 2.0 | 0.7 |
| Copper | (mg/L) | 0.06 | 2.2 | 1.2 |
| Molybdenum | (mg/L) | 0.04 | 2.0 | 0.7 |
| Nickel | (mg/L) | 0.00 | 50.0 | 2.9 |
| Potassium | (mg/L) | 1.00 | 64.0 | 40.0 |
| Selenium | (mg/L) | 0.04 | 100.0 | 33.4 |
| Iron | (mg/L) | 54.0 | 1700.0 | 632.0 |
| Zinc | (mg/L) | 0.16 | 10.0 | 3.6 |
| Total Phosphorus | (mg/L) | 4.90 | 1800.0 | 807.4 |

TABLE 2

| | | SAMPLES (A) | | | | | |
|---|---|---|---|---|---|---|---|
| Parameter | Units | A | B | C | D | E | F |
| BOD | (mg/L) | | | | | | |
| COD | (mg/L) | | 150000 | 250000 | 297000 | 230000 | 240000 |
| TKN | (mg/L) | 6613.7 | 4453.7 | 3736.7 | 5691.5 | 5247.7 | 3656.9 |
| O&G | (%) | | 0.8 | | | | |
| Fat | (%) | | | 3.49 | 2.96 | 5.86 | 1.58 |
| Ammonia | (mg/L) | 43.1 | 14.6 | 24.9 | 32.2 | 67.7 | 61.0 |
| Total Solids | (%) | 13.3 | 10.3 | 6.9 | 8.4 | 11.0 | 9.6 |
| Moisture | (%) | 86.7 | 89.7 | 93.1 | 91.6 | 89.0 | 90.4 |
| Nitrate-Nitrite | (mg/L) | 0.02 | 0.1 | 0.4 | 0.3 | 0.4 | 0.6 |
| Protein | (%) | | 2.86 | 2.34 | 3.56 | 3.28 | 2.29 |
| Mercury | (mg/L) | 0.002 | | | | | |
| Arsenic | (mg/L) | 0.03 | | | | | |
| Cadinium | (mg/L) | 0.04 | | | | | |
| Chromium | (mg/L) | 0.01 | | | | | |
| Copper | (mg/L) | 0.94 | 1.1 | 0.92 | 1.2 | 1.3 | 0.07 |
| Molybdenum | (mg/L) | 0.06 | | | | | |
| Nickel | (mg/L) | 0.1 | 0.11 | 0.08 | 0.11 | 0.11 | 0 |
| Potassium | (mg/L) | 64 | | | | | |
| Selenium | (mg/L) | 0.04 | | | | | |
| Iron | (mg/L) | | 1700 | 361 | 350 | 1600 | 99 |
| Zinc | (mg/L) | 3.9 | 4.3 | 3.6 | 5.7 | 5.5 | 0.29 |
| Total Phosphorus | (mg/L) | 4.9 | 730 | 850 | 1200 | 1300 | 1600 |
| | | Samples (B) | | | | | |
| | | G | H | I | J | K | L |
| BOD | (mg/L) | | | | | | |
| COD | (mg/L) | | 130000 | 140000 | 229000 | 111000 | 87000 |
| TKN | (mg/L) | 7056 | 5680.5 | 3704.7 | 3008.2 | 4425.3 | 5185.2 |
| O&G | (%) | | 2.49 | | | | |
| Fat | (%) | | | 4.0 | 0.8 | 2.94 | 2.82 |
| Ammonia | (mg/L) | 812 | 36 | 19.4 | 21.6 | 32.5 | 29.1 |
| Total Solids | (%) | 12.5 | 12.3 | 7.1 | 7.3 | 7.0 | 6.4 |
| Moisture | (%) | 87.5 | 87.7 | 92.9 | 92.7 | 93.0 | 93.6 |
| Nitrate-Nitrite | (mg/L) | 1.74 | 0.1 | 0.3 | 0.4 | 0.6 | 0.4 |
| Protein | (%) | | 3.64 | 2.32 | 1.88 | 2.77 | 3.24 |
| Mercury | (mg/L) | 0.1 | | | | | |
| Arsenic | (mg/L) | 0.5 | | | | | |
| Cadinium | (mg/L) | 2 | | | | | |
| Chromium | (mg/L) | 2 | | | | | |
| Copper | (mg/L) | 2 | 1.9 | 1.2 | 1.2 | 1.6 | 0.06 |
| Molybdenum | (mg/L) | 2 | | | | | |
| Nickel | (mg/L) | 50 | 0.13 | 0.09 | 0.11 | 0.15 | 0 |
| Potassium | (mg/L) | 1 | | | | | |
| Selenium | (mg/L) | 100 | | | | | |
| Iron | (mg/L) | | 1000 | 210 | 290 | 1000 | 54 |

TABLE 2-continued

| | | | | | | | |
|---|---|---|---|---|---|---|---|
| Zinc | (mg/L) | 0.3 | 5.3 | 3.8 | 3.6 | 3.2 | 0.16 |
| Total Phosphorus | (mg/L) | 78 | 700 | 580 | 1100 | 820 | 730 |

| | | Sample (C) | | | | | |
|---|---|---|---|---|---|---|---|
| | | M | N | O | P | Q | R |
| BOD | (mg/L) | | | | | | |
| COD | (mg/L) | | 140000 | 190000 | 163000 | 260000 | 170000 |
| TKN | (mg/L) | 2756.6 | 4839.4 | 4718.0 | 3199.1 | 3297.0 | 4356.2 |
| O&G | (%) | | 4.32 | | | | |
| Fat | (%) | | | 2.45 | 1.33 | 1.61 | 0.66 |
| Ammonia | (mg/L) | 29.2 | 38.2 | 20.7 | 40.3 | 36.3 | 38.7 |
| Total Solids | (%) | 6.2 | 8.5 | 8.7 | 9.4 | 8.0 | 9.8 |
| Moisture | (%) | 93.8 | 91.5 | 91.3 | 90.6 | 92.0 | 90.2 |
| Nitrate-Nitrite | (mg/L) | 0.4 | 0.1 | 0.1 | 0.4 | 0.3 | 0.2 |
| Protein | (%) | | 3.11 | 2.95 | 2.0 | 2.06 | 2.72 |
| Mercury | (mg/L) | 0.002 | | | | | |
| Arsenic | (mg/L) | 0.03 | | | | | |
| Cadinium | (mg/L) | 0.01 | | | | | |
| Chromium | (mg/L) | 0.01 | | | | | |
| Copper | (mg/L) | 0.89 | 2.1 | 1.9 | 2.2 | 1.7 | 0.18 |
| Molybdenum | (mg/L) | 0.04 | | | | | |
| Nickel | (mg/L) | 0.05 | 0.1 | 0.11 | 0.26 | 0.1 | 0 |
| Potassium | (mg/L) | 55 | | | | | |
| Selenium | (mg/L) | 0.04 | | | | | |
| Iron | (mg/L) | | 1000 | 330 | 610 | 800 | 76 |
| Zinc | (mg/L) | 2.9 | 5.2 | 3.9 | 10 | 3.5 | 0.22 |
| Total Phosphorus | (mg/L) | 280 | 420 | 810 | 1800 | 620 | 910 |

Although the specific composition of the byproduct materials from other food, animal, or vegetable processing plants may be slightly different than indicated in the Tables above, the system according to the present invention can similarly treat other byproducts with similar results.

FULL SCALE OPERATION

Referring to FIG. 1, 55,000 gallons per day (gpd) or 458,700 pounds per day (ppd) of (food byproducts) BP can be continuously introduced into the EQ tank 10 having a 100,000 gallon capacity, and additional recycling water W' may be added into the EQ tank 10. The mixture ratio introduced into the EQ tank 10 can vary depending on the characteristics of the byproducts BP to achieve the desired mixed batch characteristics. Since the 100,000-gallon tank is filled at 55,000 gpd, a hydraulic retention time (HRT) is 1.8 days (HRT can be expected to be vary between 1–5 days). The mixed influent IN overflowing from the EQ tank can be continuously fed to the anaerobic reactor vessel 20 having a 5,000,000 gallon capacity. If the 5,000,000-gallon vessel is filled at 55,000 gpd, the HRT would be 91 days (HRT can be expected to be variable between 10–100 days). Based on the extrapolated data from the above, the anaerobic treatment unit 20 is expected to remove 92% of chemical oxygen demand (COD) (expected COD removal can be variable between 90–95+%), with 20% total Kjeldahl Nitrogen (TKN) tied up in solids (expected to be between 15–30%), 80% total phosphorous tied up in solids (expected to be between 70–95%), 100% recycle flow (expected to be between 0–500%), 45,000 MLSS (expected to be between 10,000–70,000 mg/L), 0.45 BOD/COD (expected to be between 0.3–0.7), and at a 35° C. operating temperature (operable between 20–60° C.).

Liquid Solid Separation and Solids Handling

The digested effluent DEF from the digester can be centrifuged using a centrifuge to capture about 85% solids (expected capture to be between 60–85+%), with about 20% of the captured solids being cake solids (expected about 10–35%) and about 72% volatile solids (expected about 50–80%). The clarified liquid CL from the centrifuge 30 can be fed to the ammonia removal and recovery stage (50-70) described above and further described below.

Waste solids are expected to be generated at a rate of 0.08 kg of waste solids per kg of COD removed (expected to be between 0.01–0.15). A significant portion of the solids fed into the digester 20 are also broken down and converted to bio-gas BG and ammonia. As previously described, waste solids from the centrifuge 30 can be further processed, e.g., further dewatered, dried, granulated, acidulated, etc., for conversion into usable fertilizer products and/or soil amendments. As described previously, the centrifuge 30 could also be installed after the ammonia stripper 50 rather than after the anaerobic digester 20.

Ammonia Removal and Recovery Stage

Air at 1,153,699 ppd or 300 scfm/gal (expected rate to be between 200–500 scfm/gal) at nominal air temperature of 75° F. (expected to be between 60–80° F.) are fed to the ammonia stripper 50 to achieve about 95% removal of ammonia (expected removal to be between 90–98%) from the clarified liquid CL fed from the centrifuge 30. The clarified liquid CL fed to the ammonia stripper 50 can be mixed with an alkali AK (to increase the pH level to enhance ammonia recovery) and heated (to enhance ammonia removal from the water) to about 100° F. or above. Additional water obtained (i.e., in addition to the influent feed) is also recycled through the stripper column 52 to maximize ammonia removal from the water.

Steam, however, also could be used to reduce stripper gas volume and further improve ammonia stripping performance. If steam is used, it can be introduced at 5 lb/gal (expected rate to be between 5–8 lb/gal). This process would be designed to operate in the same manner as the air stripper system with the exception that steam would be used as the stripping medium.

The ammonia vapor AV at 1,155,339+lbs./day from the ammonia stripper 50 can be fed to the ammonia absorption unit 70 for recovery and capture of the ammonia in a form of a phosphoric acid stream X1, a portion of which can be circulated through the columns 72, 72' at a rate of 0.01 gpm/scfm (expected to be between 0.005 to 0.05 gpm/scfm). The phosphoric acid PA and makeup water MW delivery for the fertilizer formulation can be 0.52 gpm and 0.79 gpm, respectively, for formulating the 8-24-0 ammonium phosphate ferizer liquid fertilizer solution at a rate of 1.31 gpm.

Methane Recovery

About 6 ft$^3$ methane is expected to be generated for each pound of COD removed (expected to be between 5.0–6.5 ft$^3$ per pound of COD removed). The bio-gas BG has a heating value of 706 BTU/ft$^3$ (expected to be between 600–800 BTU/ft$^3$). The bio-gas can be used for various energy recovery purposes, including production of steam, power, heating uses, etc.

Tables 3-1 to 3-4 below show the detail data for the above fill operation example.

TABLE 3-1

(BYPRODUCT TREATMENT)

| Description | Flow (gpd) | Flow (ppd) | TSS (mg/L) | TSS (ppd) | Solids (%) | COD (mg/L) | COD (ppd) | TKN or NH$_3$—N (mg/L) | TKN or NH$_3$—N (ppd) | Total P. (mg/L) | Total P. (ppd) |
|---|---|---|---|---|---|---|---|---|---|---|---|
| Influent (IN) | 55,000 | 458,700 | 90,389 | 41,461 | 9.0 | 185,733 | 85,196 | 4,535 | 2,080 | 807 | 370 |
| Effluent to Centrifuge (DEF) | 55,000 | 458,700 | 13,670 | 6,270 | 1.4 | 14,859 | 6,816 | | | | |
| Clarified Liquid (CL) | 51,805 | 432,051 | 2,117 | 941 | | 7,578 | 3,274 | 3,996 | 1,726 | 274 | 119 |
| Recycle | 55,000 | 458,700 | 13,670 | 6,270 | 1.4 | | | | | | |

TABLE 3-2

(SOLIDS HANDLING)

| Description | Flow (gpd) | Flow (ppd) | Water (ppd) | TSS (mg/L) | TSS (ppd) | Solids (%) | TKN (ppd) | TKN (%)[1] | Total P. (ppd) | Total P. (%)[1] |
|---|---|---|---|---|---|---|---|---|---|---|
| Solid Fraction (SF) | | 26,649 | 21,319 | | 5,300 | 20 | 354 | 7 | 252 | 5 |

Notes:
[1] Dry Weight Basis

TABLE 3-3

(AMMONIA REMOVAL & RECOVERY)

| Description | Flow (gpd) | Flow (ppd) | Water (ppd) | TSS (mg/L) | TSS (ppd) | Solids (%) | NH$_3$—N, NH$_3$ (ppd) | Total P. (ppd) |
|---|---|---|---|---|---|---|---|---|
| Clarified Liquid (CL) | 51,805 | 432,051 | | 2,177 | 941 | | 1,726 | 119 |
| Air Input (A/S) | | 1,153,699 | | | | | | |
| Vapor Production (AV) | | 1,155,339 | | | | | 1,640 | |
| Liquid (WW) | 51,608 | 430,411 | | 2,185 | 941 | | 86 | 119 |
| Vapor to Atm. (AE) | | 1,115,613 | | | | | | |
| Amm. Phos. Soln (X1)[2] | 1,887 | 20,650 | 13,700 | | | | 1,992 | 2,165 |
| Makeup Water (MW) | 1,132 | 9,476 | 9,476 | | | | | |
| Phos. Acid Makeup (AC)[3] | 755 | 9,182 | 4224 | | | | | 2,165 |

Notes:
[2] 8-24-0 Solution
[3] 54% Phosphoric Acid Solution

TABLE 3-4

(METHANE RECOVERY)

| Description | Q CH$_4$ (scfd) | Q total (scfd) | Energy (Btu/d) | CH$_4$ (%) | CO$_2$ (%) | H$_2$S (%) | O$_2$ (%) |
|---|---|---|---|---|---|---|---|
| Biogas (BG) | 470,281 | 666,121 | 4.70E + 08 | 70.6 | 29 | 0.04 | 0.4 |

The degree of byproduct digestion COD removal is expected to be effective to 90% to 95%, when the HRT of 100 days or less, with COD loading at about 4 kg/m$^3$ per day or less. Moreover, 80% or more of the nitrogen and phosphorus can be expected to be recovered from the byproducts for use as fertilizer and/or soil amendment products or ingredients in these materials.

EXAMPLE (PILOT TEST)

Between the time period of May 1999 and April 2000, the anaerobic treatment unit 20, the ammonia stripper 50, and the ammonia absorption units 70 of the system 1 was actually tested at a food processing plant (poultry processing plant) located in Northwest Alabama. DAF skimmings produced at this plant are costly to process due to the large amount of water they contain and their poor quality and variable quality. Furthermore, they have a very limited market and must be sold at a substantially discounted price. DAF skimmings from this plant were highly degradable anaerobically (95 percent COD removal) in a simple complete-mix serum bottle test loaded at 4 kg COD/$m^3$·d.

The pilot testing was conducted to confirm the overall feasibility and effectiveness of the present system 1 described above. A summary of the pilot test is described below.

Anaerobic Treatment Unit

Referring to FIG. 2, the anaerobic treatment unit 20 comprises two identical 1000-gallon anaerobic reactor vessels 22 (only one shown). These two reactor vessels, which are cylindrical in construction, were installed horizontally along their long axes at the poultry processing plant located in Northwest, Alabama. Each tank was completely gas-sealed, with a bio-gas vent 23, bio-gas sample ports 24, and a bio-gas recirculation line 25F with valves 28, and influent and effluent lines 26, 27, with valves 28. Each reactor vessel 22 has six sample ports 24 equally spaced along the length of the top of the reactor vessel 22 and a temperature gauge TG at each end. The reactor vessels 22 were insulated and temperature controlled using electric heat and thermostat control H to maintain the desired operating temperature. A bio-gas metering and collection system 21 was also installed on each of the reactor vessels 22 to measure the bio-gas production and to analyze the bio-gas composition.

Pilot 1 (Mesophilic)

The following discussion provides a summary of the operating and performance data for the first anaerobic pilot reactor vessel designated as Pilot 1 for the time period between Sep. 1, 1999 and Nov. 15, 1999. Start-up of the pilot reactor vessels (i.e., initiation of influent feed) actually began in May 1999. An adequate biomass level in the reactor vessels were achieved after several months. This start-up period was also allowed the biomass to properly assimilate and acclimate to the DAF skimmings influent stream. By Sep. 1, 1999, the biomass in the reactor vessels had generally adequately matured, and the reactor vessels were effectively processing/treating the DAF skimmings.

Average operating conditions for the Pilot 1 reactor vessel from Sep. 1, 1999 to Nov. 15, 1999 were as follows:

| | |
|---|---|
| Influent flow | 16.9 gpd |
| Recycle flow | 50.6 gpd (approximately 300% recycle) |
| Temperature | 35 deg C. |
| HRT | 83 days |
| Influent COD | 429,000 mg/l |
| Influent TSS | 150,000 mg/l |
| Influent FOG | 89,500 mg/l |
| Influent TKN | 6,360 mg/l |
| Influent $NH_3$-N | 170 mg/l |
| Influent Total P | 1,450 mg/l |
| COD loading | 6.1 kgCOD/$m^3$*d |
| TSS loading | 2.1 kgCOD/$m^3$*d |

Since the daily influent flow to the reactor vessel was relatively small, the DAF skimmings influents IN was manually batch fed (i.e., via buckets) several times a day into the first reactor vessel through an elevated feed container 26F connected to the inlet line 26. Soon after each feeding event, the effluent DEF from the first reactor vessel was also collected. The DAF skimmings influent IN produced at the processing plant during both the processing shifts and sanitation shift were fed to the first reactor vessel in accordance with the total volumes generated during these shifts. The DAF skmmings influent IN fed to the first reactor vessel was also manually composited (conditioned/blended) to simulate operation under the conditions expected in the above described full scale system 1. A portion of the digested effluent DEF was recycled back to the first reactor vessel with a diaphragm pump through its recycling line 27R. Various system parameters (pH, volatile acid to partial alkanity ratio, influent and effluent constituent levels, operating temperature, etc.) were closely monitored during pilot testing to allow proper evaluation of system performance, stability, etc. A portion of the bio-gas produced in the first reactor vessel was also recirculated back via its recirculation line 25 to the first third of the first reactor vessel through a diffuser assembly (not shown) to improve mixing in the first reactor vessel and to improve treatment performance.

Effluent characteristic and system performance for the Pilot 1 reactor vessel during the time period specified above were as follows:

| | |
|---|---|
| COD effluent | 40,400 mg/l |
| TSS effluent | 18,600 mg/l |
| FOG effluent | 2,450 mg/l |
| TKN effluent | 2,600 mg/l |
| $NH_3$.N effluent | 1,630 mg/l |
| COD removal | 90.6% |
| TSS removal | 87.6% |
| FOG removal | 97.3% |
| Effluent pH | approximately 7.5 to 7.9 |

The average bio-gas BG yield from the first (Pilot 1) reactor vessel during the time period specified was 230 $ft^3$/day, with an average composition of 69% methane, 29% carbon dioxide, 0.4% oxygen, and 0.04% hydrogen sulfide. The actual bio-gas production was lower than expected (i.e., less than the estimated theoretical yield). This data suggests that there was either a bio-gas leak in the first reactor vessel as the measured bio-gas was only a fraction of the total expected bio-gas generated, or non-degraded solids had built up in the first reactor vessel.

The fraction of the TKN in the effluent as compared to the influent level was approximately 41%, and approximately 63% of the effluent TKN was in the form of ammonia. Magnesium hydroxide was fed into the first reactor vessel for a portion of the pilot testing. This formed magnesium-ammonium-phosphate (or struvite) in the solids that had accumulated in the first reactor over the trial period. The formation of struvite caused a significant difference in influent and effluent TKN levels. Phosphorus is also a component of the struvite. A portion of the TKN was also contained in the biomass accumulated in the first reactor vessel during the pilot testing. It is expected that 15% to 20% of the TKN will be accumulated in the biomass, discounting the estimated loss of TKN due to the formation of struvite. Discontinuing the magnesium hydroxide addition in October 1999 increased the effluent TKN and $NH_3$—N levels (i.e., over 4,100 mg/l in February 2000) over the next several months. Lastly, no signs of ammonia related toxicity were seen due to the elevated levels of unionized ammonia in the first reactor vessel, even after the use of magnesium hydroxide had been discontinued and the ammonia levels in the system had significantly increased.

The calculated waste biosolids yield during pilot testing for the Pilot 1 reactor vessel was 0.08 kg solids/kg COD removal. This value includes the solids in the reactor effluent as well as the solids that had accumulated in the reactor vessel. This data reflects a combination of very good digestion of influent solids and low bacterial yield.

Pilot 2 (Thermophilic)

The Pilot 2 reactor vessel was tested in the thermophilic temperature range (i.e., 55° C.) from December 1999 to April 2000. However, performance of the system was less than favorable (i.e., very limited treatment performance). It is suspected that this operational problem was related to increased unionized ammonia toxicity at this higher operating temperature, as the Pilot 2 reactor vessel was rapidly converted to a thermophilic operating temperature. This would not give the bacteria adequate time to acclimate and assimilate to these different operating conditions. A slower transition to a thermophilic operating temperature and a lower operating pH would likely correct the performance problems indicated in the Pilot 2 reactor vessel (i.e., provide successfull operation of the process in the thermophilic temperature range).

Ammonia Removal and Recovery Pilot Testing

Digested effluent DEF from the Pilot 1 and 2 reactor vessels was discharged into containers 22C, and this effluent was used to conduct various trials for the ammonia stripping and ammonia absorption pilot stage for production of fluid fertilizer solutions. The results of this portion of the pilot project are summarized below.

A small pilot system was installed at the food processing plant located in Northwest Alabama in order to determine the optimum conditions for stripping ammonia from the collected effluent DEF and recovery of the stripped ammonia as a liquid fertilizer product. The pilot system consisted of four, six inch diameter by four foot tall columns (6"×4') connected in series, substantially as illustrated in FIG. 1. This pilot system was designed to allow one to four of the columns to be used for the ammonia stripping and absorption studies. Each of the columns 52, 72, 72' was also provided with a surge tank 54, 74, 74' for feeding and recirculation liquid. Peristaltic pumps 60 provided circulation in the columns 54, 74, 74', influent liquid feed to the stripping column 54 and phosphoric acid feed AC and water feed MW to the ammonia absorption column 74'. The blower 65 and in-line valve provided variable airflow in the ammonia stripper column 52 and ammonia absorption columns 72, 72'. A propane heated oil bath with heating coils was used to heat the influent liquid feed to the pilot system as required.

Each of the columns 52, 72, 72' was filled with packing, such as plastic saddles. Other types of "dumped" or structured packing material can be used. The ammonia stripping column 52 used a recirculation line RL with a forward feed of fresh material coming into the column from the surge tank 54, with the effluent removed from the surge tank using a pump 60. Gravity also can be used for this purpose. Similarly, the ammonia absorption columns 72, 74' each also included a recirculation loop with a forward feed of the ammonia containing air stream from the ammonia stripper column 52. The phosphoric acid solution AC and water feed MW used in the ammonia absorption column 72' for formulation of the liquid fertilizer were fed into surge tank 74'. In the two-stage column design, product from the second stage absorption column 72' was fed to the first stage absorption column surge tank 74, and 8-24-0 liquid fertilizer product was removed from the first stage surge tank 74, as illustrated in FIG. 1. If a single stage absorption column 72 is used, phosphoric acid AC and water MW are fed into the first stage surge tank 74, and 8-24-0 liquid fertilizer product is removed from the recirculation loop.

Initial tests were performed to determine the optimum pH for ammonia stripping. These tests were conducted via batch stripping trials and were performed at pH values ranging from 7.4 to 10.0. Tests involved recirculating 3.25 gallons of liquid through one 6"×4' column for 30 minutes. As expected, the removal rate of ammonia increased rapidly as the pH was increased (40% removal at pH 9 vs. 83% removal at pH 10). Either sodium hydroxide (caustic) or potassium hydroxide can be used to adjust pH. The liquid required about 6 grams/liter (0.05 pounds/gallon) of a 50% caustic solution for adjustment to pH 10.

Similar tests were conducted to determine the optimum rate of liquid flow through the ammonia stripping column(s). Flow rates ranging from 0.3 to 1.2 gpm were studied. A flow of 0.6 gpm was determined to be the lowest flow with optimum recovery. Excessive foaming was a problem at the higher flow rates. In other tests, it was determined that airflow through the ammonia stripping columns 52, 72, 72' was not as critical as liquid flow therethrough, but needed to be above 20 cfm. Best results were obtained at about 45 cfm where ammonia stripping was high and heat loss low. The stripping rate of ammonia also increased with an increase in temperature. Since there is rapid temperature equilibrium between the air and liquid phases, either stream can be heated to give the desired results. Ammonia recovery increased about 15% with each 10° F. rise in temperature. A temperature of 90° F. or greater is desirable.

Ammonia absorption/recovery from the air stream from the ammonia stripping columns was approximately 100 percent at an absorption column liquid recirculation rate of approximately 0.59 gpm. The ammonia absorption columns were also operated at a temperature of approximately 100° F. and the pH of the recirculation liquid was maintained in the range of 6.5 to 6.8. The pH of the 8-24-0 fertilizer solution obtained was approximately 6.5. In the single stage design, additional ammonia had to be fed into the surge tank to produce the 8-24-0 fertilizer solution, while this additional ammonia feed was not required in the two stage design. Pilot testing focused on the production of an 8-24-0 fertilizer solution. Other fertilizer solution formulations, however, could also be produced in the ammonia absorption column(s) if desired.

Using two 6"×4' columns 52 for ammonia stripping and one 6"×4' column 72 for ammonia absorption/recovery, greater than 90% of the ammonia was continuously stripped, using air and the clarified effluent liquid CL containing 1,800 mg/L ammonia nitrogen. This ammonia was essentially all recovered to produce an 8-24-0 ammonium phosphate liquid fertilizer in the ammonia absorption column. Other design/operation parameters for this example included an airflow at approximately 45 cfm, an anaerobic treatment unit effluent feed rate (i.e., influent to ammonia removal and recovery units) at approximately 0.13 gpm, and an ammonia stripper and ammonia absorption column operating temperatures of 100° F. The phosphoric acid (54% $P_2O_5$) and water feed rates for the ammonia absorption column in this example were approximately 0.00066 gpm (or 2.5 ml per minute) and 0.0011 gpm (or 4 ml per minute), respectively. The 8-24-0 ammonium phosphate liquid fertilizer production rate for this example was approximately 0.00192 gpm (or 7.27 ml per minute).

In November/December, the ammonia nitrogen concentration in the effluent from the anaerobic treatment unit began to significantly increase. This change in operating conditions increased the ammonia stripping rate and the 8-24-0 ammonium phosphate fertilizer production rate accordingly. Of course, the phosphoric acid AC and make-up water feed MW to the ammonia absorption column also increased according. Overall, this change in ammonia influent concentrations did not significantly impact operation of the ammonia stripper or absorption columns.

Ammonia removal and recovery trials were performed using effluent directly from the anaerobic treatment unit (i.e., without the liquid-solids separation unit 30). The clarified liquid effluent CL was obtained by gravity separation/settling to remove the significant portion of the solids (i.e., greater than 85%) from the digested effluent DEF. The ammonia removal and recovery columns operated well (i.e., ammonia stripping and recovery successful) under either condition. The ammonia stripping rate and 8-24-0 fertilizer production rate were significantly higher when the unclarified effluent was used in ammonia removal and recovery operations. However, packing fouling could be an issue if the unclarified effluent from the anaerobic treatment unit was fed to the ammonia removal and recovery stage. Therefore, in the full scale system described above, the liquid-solids separation stage can occur either before or after the ammonia removal stage, depending on the actual effluent quality characteristics desired and the packing fouling potential.

Based on this pilot testing, the full scale system previously described, can include a two stage ammonia stripping column design for optimum ammonia stripping from the clarified effluent CL, and a two stage ammonia absorption column design for optimum ammonia absorption and fertilizer solution production. These columns can include a recirculation loop with a forward feed (connected in series) of fresh material (i.e., either influent anaerobic treatment unit effluent or stripping column air effluent). Liquid feed can be fed into the surge tanks on the columns, which could provide 30 to 60 minutes of retention time based on the inlet flow rate and ammonia concentration. A dumped style packing material can be used in the ammonia stripping and ammonia absorption columns. A liquid flow rate of approximately 3 gpm per square foot of surface area across the columns can be used, and this design will provide an average pressure drop of approximately 1" of water across each 6" by 4' column. An airflow rate of 3–5 feet per second through the air stripping column 52. Similar water and airflow rates can also be used in the ammonia absorption columns 72, 72'. The pH of the incoming water to the stripper column can be adjusted to 10.0 using a caustic solution and the system operating temperature can be maintained at approximately 100° F. for optimum ammonia stripping, ammonia absorption and ammonium phosphate fertilizer production. Maintaining column temperature will be most critical during cold weather. Other designs (air flows, packing types, liquid flows, stripper and absorption column designs, etc.) also can be used for this purpose.

In summary, operation of the pilot unit confirmed an anaerobic treatment process is suitable for treatment of the DAF byproduct materials produced at this food processing plant. The ammonia removal and recovery stage also performed as expected and the 8-24-0 liquid fertilizer formulation was produced. In addition, limited work performed on the waste biosolids stream indicates this material will yield an excellent fertilizer and/or soil amendment material. These biosolids will contain significant levels of nitrogen, phosphorus and other trace nutrients necessary for plant growth. Further, the pilot testing confirmed that the design and operational parameters described herein for the apparatus are applicable, and these parameters can be used to design and operate a full scale system for treatment of DAF skimmings from food, animal and vegetable product and byproduct processing facilities. Pilot testing confirmed this apparatus produces significant quantities of useful products including a high BTU value bio-gas, ammonia containing liquid fertilizer solution, and solids materials that can also be used for fertilizer and/or soil amendment applications.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims

I claim:

1. A method of converting animal, vegetable, and food byproducts into useful bio-gas and fertilizer, comprising:

anaerobically digesting or breaking down the byproducts in an anaerobic digester to produce bio-gas containing methane and an effluent;

collecting and storing the bio-gas from the digester into a tank;

transferring the effluent to an ammonia stripper to remove ammonia from the effluent;

transferring the ammonia vapor from the ammonia stripper to an ammonia absorption unit to absorb the ammonia component into an aqueous solution to form an ammonium solution; and separating the effluent from the ammonia stripper into liquid effluents and solid effluents.

2. A method according to claim 1 further comprising:

conditioning the byproducts with a conditioning agent to enhance anaerobic digestion before introducing the byproducts into the anaerobic digester;

dewatering the solid effluents after separating the liquid effluent to form a slow release fertilizer compound.

3. A method according to claim 1, wherein the ammonia vapor from the ammonia stripper is transferred to an ammonia absorption unit to absorb the ammonia component into an acidic aqueous solution.

4. The method according to claim 1, wherein said animal, vegetable, and food byproducts have a total Kjeldahl nitrogen content of at least about 2700 mg/L.

5. The method according to claim 1, wherein said animal, vegetable, and food byproducts have a fat, oil and grease content of at least about 0.6%.

6. A system for converting animal, vegetable, and food byproducts into useful bio-gas and fertilizer, comprising:

an anaerobic digester that digests or breaks down the byproducts and produces bio-gas containing methane and effluent;

an ammonia stripper that receives the effluent from the anaerobic digester and removes an ammonia component from the effluent as an ammonia vapor;

an ammonia absorption unit that receives the ammonia vapor from the ammonia stripper and absorbs the ammonia component into an aqueous solution to form an ammonium solution; and a liquid-solids separating unit that receives effluent from the ammonia stripper and separates solids from liquid effluent.

7. A system according to claim 6, further including an equalization tank for conditioning the byproducts before the byproducts are introduced into the anaerobic digester.

8. A system according to claim 6, further including a solids processing unit for dewatering the solids received from the liquid-solids separating unit.

9. A system according to claim 6, wherein the liquid-solids separating unit comprises a centrifuge.

10. A system according to claim 6, wherein the ammonia stripper comprises at least one set of a surge tank and a column feeding into the surge tank, and an air blower for blowing air into the column, wherein the ammonia component in the liquid effluent is transferred into the ammonia vapor by flowing air through the column while the liquid effluent is circulated from the surge tank through the column.

11. A system according to claim 10, wherein the liquid effluent is circulated through the column in a first direction and the air is directed into the column in a second direction, which is opposite to the first direction.

12. A system according to claim 6, wherein the ammonia absorbing unit comprises at least one set of a surge tank and a column feeding into the surge tank, wherein the ammonia component in the ammonia vapor is transferred into the aqueous solution by flowing the ammonia vapor through the column while the water is circulated from the surge tank through the column.

13. A system according to claim 12, wherein the water is circulated through the column in a first direction and the ammonia vapor is directed into the column in a second direction, which is opposite to the first direction.

14. A system according to claim 6, wherein the ammonia absorption unit receives the ammonia vapor from the ammonia stripper and absorbs the ammonia component into an acidic aqueous solution.

15. The system according to claim 6, wherein said animal, vegetable, and food byproducts have a total Kjeldahl nitrogen content of at least about 2700 mg/L.

16. The system according to claim 6, wherein said animal, vegetable, and food byproducts have a fat, oil and grease content of at least about 0.6%.

\* \* \* \* \*